Patented June 20, 1933

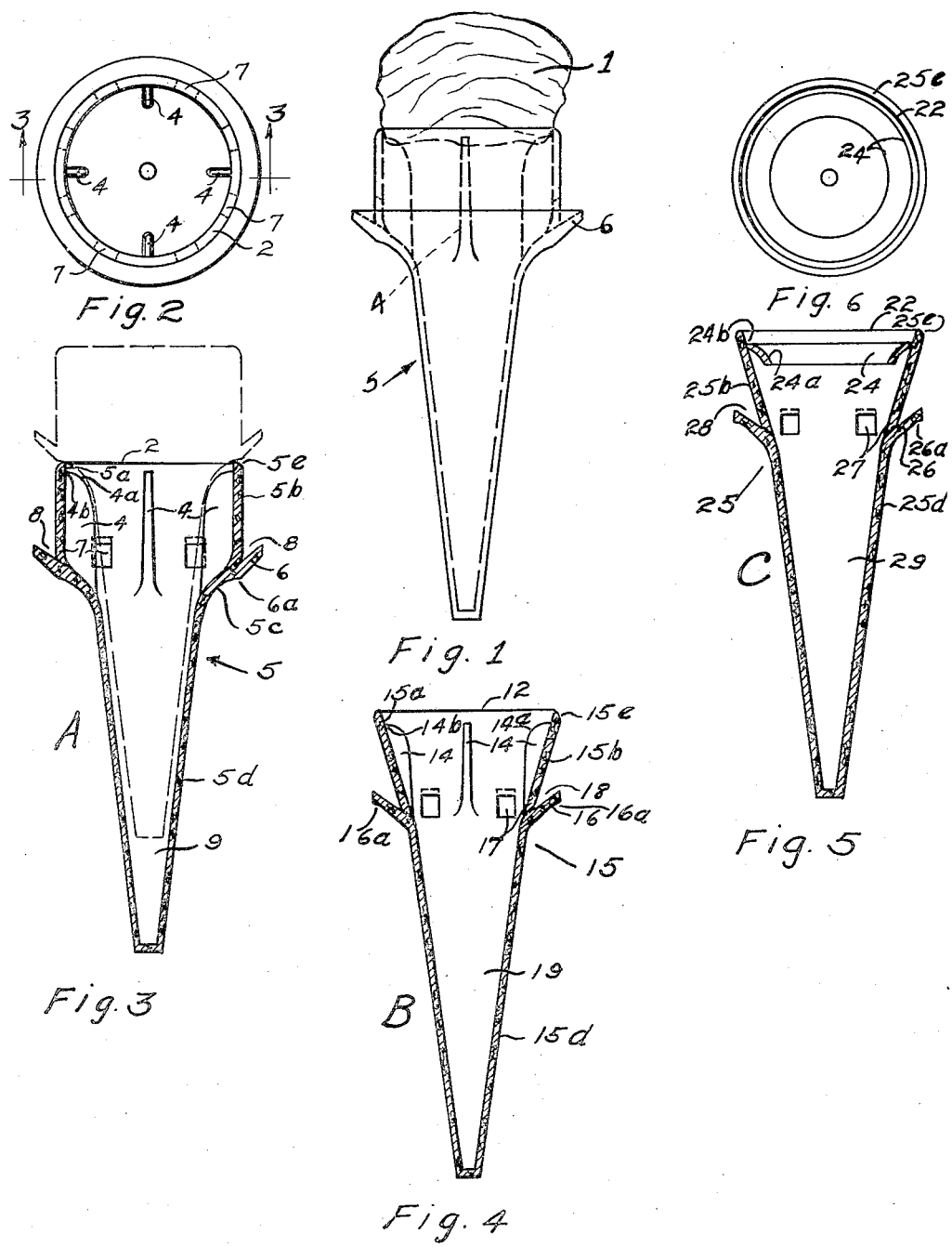

1,914,894

UNITED STATES PATENT OFFICE

REUBEN MOSKOWITZ, OF NEW YORK, N. Y.

CONE

Application filed October 7, 1930. Serial No. 486,967.

This invention relates to holders for moldable confections such as ice-cream and the like. More particularly it relates to improved cone-shaped holders for serving such confections.

An object of this invention is to provide a holder for moldable material such as ice-cream and the like, and having means to hold said moldable material securely in place while being consumed, and furthermore to support said confection in the position most accessible to the user; said means further serving to stiffen or to reinforce portions of the holder against breakage or crushing when in use.

Another object of this invention is to provide a holder with drip-catching means for ice-cream and such like confections having a tendency to become liquid when exposed to atmospheric temperature for even short periods of time, said means further serving to reinforce or stiffen the holder.

A further object of this invention is to provide a simple, strong and rugged holder of the character described which shall be comparatively cheap to manufacture and yet practical and efficient to a high degree.

Other objects of this invention will partly be obvious and partly pointed out hereinafter.

Accordingly, the invention consists in the features of construction, combinations and arrangements of parts exemplified in the specific constructions hereinafter described, the scope of the application being indicated in the appended claims.

In the accompanying drawing in which is shown various embodiments of this invention, Fig. 1 is a front elevational view of a holder embodying my invention with a scoopful of ice-cream or the like moldable confection carried thereby.

Fig. 2 is a top plan view of the cone-shaped holder shown in Fig. 1.

Fig. 3 is a cross-sectional view taken on line 3—3 of Fig. 2.

Fig. 4 is a view similar to that of Fig. 3 of a modified construction.

Fig. 5 is an axial cross-sectional view of a still further modified construction.

Fig. 6 is a top plan view of Fig. 5.

Referring now in detail to the drawing and particularly to Figs. 1, 2 and 3 thereof, A designates a holder embodying the invention, here shown in the form of an article adapted to be held in the hand and in turn adapted to carry a measured quantity of ice-cream or the like food or moldable confection adjacent the mouth thereof. Said device A comprises a generally conical body 5 open at one end and converging towards the closed end, preferably made of molded edible material and baked to form a rigid shell. Said holder comprises a lower cone shaped portion 5d serving as a handle, and extending upwardly therefrom is an intermediate portion 5c preferably having a greater taper than said portion 5d. Extending from said portion 5c is a cylindrical portion 5b having a rim 2.

Integrally formed with said body on the interior thereof are a plurality of spaced longitudinal projections or fins 4 to support the mass of confection 1 with a portion of said confection protruding above the rim of said shell. The interior projections or fins 4 extend downwardly from the mouth of said holder and inwardly from the interior surface thereof to provide shoulder portions 4a to resist the tendency of said confection to slide into the interior of the holder out of convenient reach of the consumer. Said fins further serve to become partially imbedded in the confection to aid in preventing the same from falling off the holder. The upper ends of said fins 4 terminate at points 4b below the rim 2 of the holder to leave a continuous wall portion 5a for centering the mass of confection in the mouth of the holder. The lower ends of said fins preferably terminate at the junction of portions 5d and 5c. For the purpose hereinafter appearing, each of said fins is formed with a curved upper edge portion.

For catching drippings on the outer surface of the holder, same is provided with an integral upwardly and outwardly extending portion 6 disposed substantially at the junction of portions 5b and 5c of the holder.

The holder may furthermore be formed with a plurality of openings 7 in the wall portion 5b thereof to permit the drippings caught by said annular portion 6 to drain back into the interior 9 of the holder. The openings are preferably rectangular in shape and extend to the bottom of the trough 8 whereby quick and thorough drainage is had.

The outer portion 5c of the rim 2 is curved to cause the drippings to follow its contour and be guided onto the exterior surface of portion 5b and into the trough 8. Since the annulus 6 is placed below the rim 2 of the holder and adjacent the intermediate portion 5c thereof, said annulus acts as a stop for limiting the penetration of the holders one by the other when nesting them and hence the consequent wedging and breakage of the holders is obviated. The undersurface 6a of said annulus is adapted to contact on the upper portion of the supporting holder and hence preventing the tapered portions of the holders from wedging together. To provide an extended shoulder area to support the confection, the shoulder portion 4a of the fins 4 are so curved as to prevent said fins contacting under pressure with either conical portions 5d or 5c of the following holder nested therein, to avoid wedging therewith. In nesting, one holder is thus suspended loosely within another adjacent holder. In addition to the functions outlined above, the internal fins 4 and the external annulus 6 act as strengthening or reinforcing ribs for the shell of the holder 5.

In accordance with the modification shown in Fig. 4, the device B comprises a body 15 having a tapering handle portion 15d closed at one end thereof, and a flared bell or mouth portion 15b at the upper end thereof, formed with a rim 12. The body 15 is likewise provided with longitudinal fins 14 carried by said upper portion 15b. An annulus or apron 16 surrounds the shell and is carried thereby below the rim 12 of said shell substantially at the junction of portions 15b and 15d to form a trough 18 which drains into the interior 19 of the shell thru rectangular openings 17. The shape of the holder 15 permits it to nest readily and without wedging with similarly constructed holders.

The outer portion of the undersurface 16a is adapted to contact with the rim 12 without wedging therewith, and to permit one holder to be freely suspended within another holder when nesting said holders. The outer edge of the annulus 16 is in substantial vertical alignment with the outermost edge of the mouth portion 15b to prevent the edge of said annulus from projecting materially beyond the outermost edge of portion 15b to lessen the likelihood of chipping said annulus edge and to secure space economy when packing and shipping the holders.

In accordance with the modification shown in Figs. 5 and 6, the device C comprises a holder 25, an exterior annulus 26 forming a trough 28 and an interior annular projection or shelf 24 for supporting a mass of moldable confection such as ice-cream and the like to retain it near the mouth 22 thereof in the position most accessible to the consumer. The holder 25 is substantially similar to the holder 15 shown in Fig. 4 but is provided with a shelf 24 which extends inwardly and downwardly from the open end of holder 25, preferably extending from point 24b below the rim 22 thereof. To permit said holder to be nested with others of similar construction, the shelf 24 is inwardly and downwardly curved so as to avoid wedging against the outer surface of the holder nested therein. While the shelf 24 is shown integral with the holder 25, it may be separately made and attached by any suitable means to the interior of the body 25.

It will now be seen that there is provided an article in which the objects of the invention are attained and which is further well adapted to meet the conditions of practical use.

Obviously, various possible embodiments may be made of the invention disclosed herein, it being understood that the matter herein set forth and shown in the drawing is to be interpreted as illustrative and not in a limiting sense.

Having thus described my invention, I claim as new and desire to secure by Letters Patent:—

1. In combination a container open at one end, and having an extended interior surface projecting inwardly and downwardly from said open end and a removable disc adapted to be wedged against said interior surface and retained in said container adjacent the open end thereof and substantially normal to the axis of the same.

2. An article of manufacture comprising a substantially rigid disc formed with an opening and having a substantially frustro-conical surface adapted to be supported at the outer edge thereof in an ice cream cone for supporting in turn a mass of ice cream on the frustro-conical surface thereof.

3. An ice cream cone comprising a shell formed with an open mouth portion at the upper end and closed at the other end, and a dividing wall portion extending inwardly from an intermediate portion of a substantially non-abruptly bent surface portion of said shell for dividing the space enclosed by said shell into an upper and lower cavity, said dividing wall being adapted for supporting a mass of ice cream thereon within said upper cavity.

4. An ice-cream cone comprising a shell open at one end, and an annular portion extending inwardly from an intermediate portion of a substantially non-abruptly bent surface portion of said shell to partition the interior thereof into an upper and a lower cavity, said annular portion being adapted to support a mass of ice-cream on the upper surface thereof within the upper cavity of said shell, the opening in said annular portion permitting the melted ice-cream to pass therethru into said lower cavity.

5. An ice-cream cone comprising a shell open at one end, and a frustro-conical portion extending inwardly from an intermediate portion of a substantially non-abruptly bent surface portion of said shell to partition the interior thereof into an upper and a lower cavity, said frustro-conical portion being adapted to support a mass of ice-cream on the upper surface thereof within the upper cavity of said shell, said frustro-conical portion being further provided with an opening to permit the passage therethru of the melted portion of the ice-cream into the lower cavity of said shell.

6. In an ice-cream container in combination, a hollow shell open at one end, and an insertable disk member formed of substantially rigid material, said shell being adapted to support said disk member interiorly adjacent said open end, said disk member being formed with an extended upper surface portion for supporting a mass of ice-cream thereon within said shell.

7. In an ice-cream container in combination, a hollow shell open at the upper end thereof, and an insertable disk member formed of substantially rigid material, said shell being formed adjacent the open end thereof with a downwardly converging interior surface portion to permit said disk member to be wedged thereagainst for securely retaining the same in position within said shell.

8. In an ice-cream container in combination, a hollow shell open at one end, and an insertable annular member formed of substantially rigid material adapted to support a mass of ice-cream thereon, said shell being adapted to support said annular disk member interiorly adjacent said open end.

9. In an ice-cream container in combination, a hollow shell open at one end, and an insertable frustro-conical member formed of substantially rigid material adapted to support a mass of ice-cream thereon, said shell being adapted to support said frustro-conical member interiorly adjacent said open end.

10. An article of manufacture comprising a disk formed of substantially rigid material adapted to be supported in the interior of an open-ended ice-cream holder, said disk being formed with an extended surface portion for supporting a mass of ice-cream thereon.

11. An article of manufacture comprising a substantially rigid annular disk adapted to be supported in the interior of an open-ended ice-cream holder, said disk being formed with an extended surface portion for supporting a mass of ice-cream thereon.

Signed at New York city in the county of Kings and State of New York this third day of October A. D. 1930.

REUBEN MOSKOWITZ.